March 23, 1948. I. D. HALL 2,438,437
SEPARATION OF DIOLEFINS AND CONTAMINATING HYDROCARBONS
FROM RICH AMMONIACAL AQUEOUS SOLUTIONS
Filed May 8, 1945
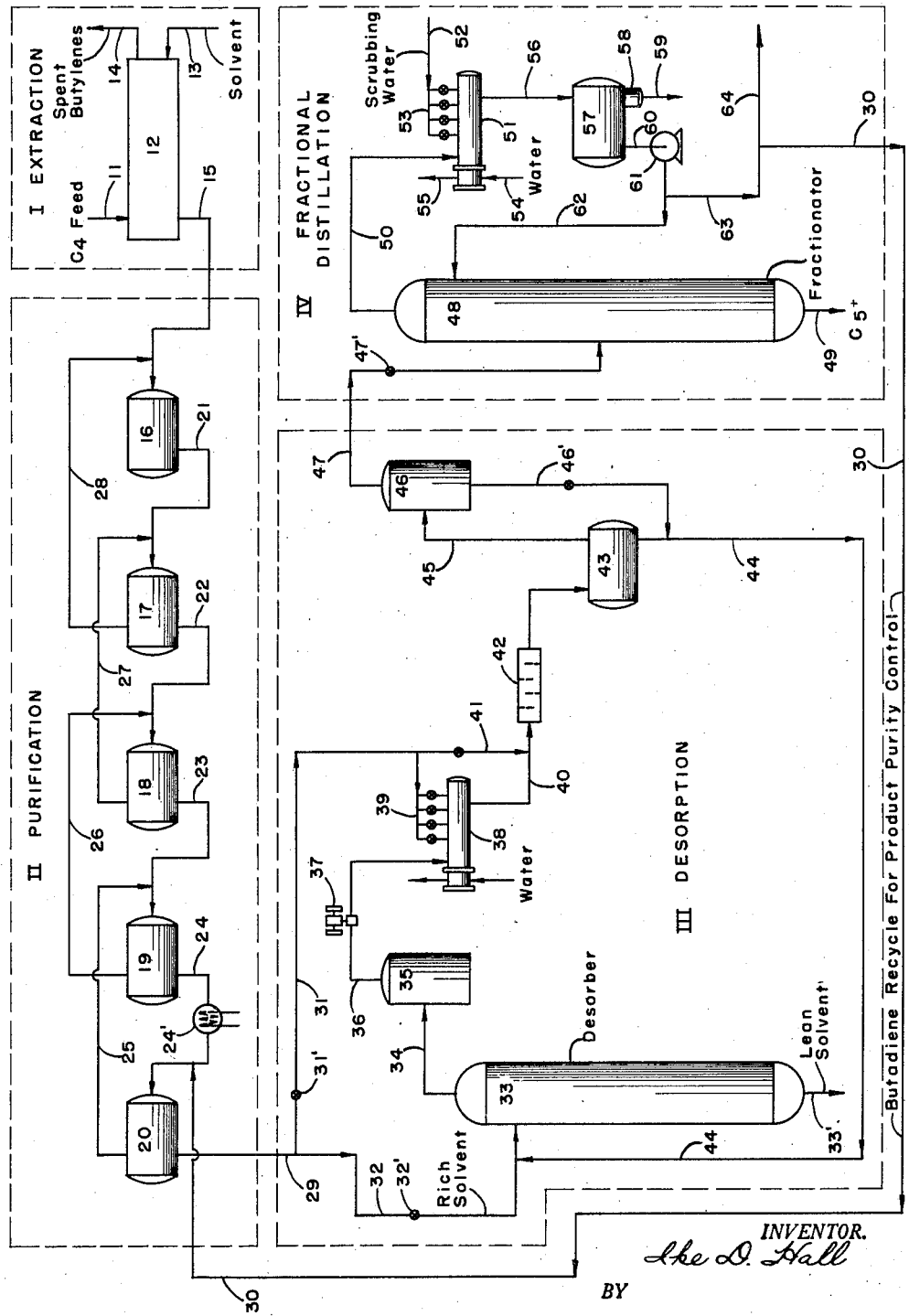
INVENTOR.
Ike D. Hall
BY
J. G. McKean
ATTORNEY.

Patented Mar. 23, 1948

2,438,437

UNITED STATES PATENT OFFICE 2,438,437

SEPARATION OF DIOLEFINS AND CONTAMI-
NATING HYDROCARBONS FROM RICH
AMMONIACAL AQUEOUS SOLUTIONS

Ike D. Hall, Baytown, Tex., assignor to Standard
Oil Development Company, a corporation of
Delaware Application May 8, 1945, Serial No. 592,612

5 Claims. (Cl. 260—681.5)

The present invention is directed to a method for recovering a substantially pure diolefin fraction from a rich aqueous ammoniacal solution obtained by contacting an aqueous ammonical solution with a hydrocarbon mixture including di-olefin. In its more specific aspects, the present invention is directed to the treatment of a rich aqueous ammoniacal solution of the character of that obtained by contacting a hydrocarbon mixture, obtained by dehydrogenating a petroleum fraction, with aqueous ammoniacal solution and separately removing diolefins and contaminating materials from the rich solution.

The process for obtaining a diolefin fraction by dehydrogenating a hydrocarbon mixture and subsequently contacting the resultant mixture with an aqueous solvent to dissolve the diolefin and form a rich solvent with subsequent desorption of the diolefin is well known to the art. As an example, it is common to pass a hydrocarbon mixture including $C_4$ olefins over a dehydrogenating catalyst maintained at a temperature in the range of 1150 to 1300° F. to convert substantial amounts of the mono-olefin in the feed stock into butadiene. The product from such a dehydrogenation step will include diolefin, diluent, such as the mono-olefin in the feed stock, as well as contaminants formed during the reaction. It is customary to fractionate this product to separate a $C_4$ fraction and to send the resulting $C_4$ fraction to an extraction stage where it is contacted with an aqueous solution to concentrate the diolefins. An aqueous solution of cuprous ammonium acetate has been found commercially desirable but other solvents, such as ammoniacal water, water, and aqueous solution of silver nitrate, mercuric cyanide and cuprous chloride may also be employed for this purpose. The rich solvent resulting from this extraction stage is then desorbed to recover a butadiene fraction therefrom. The butadiene fraction is then usually subjected to a fractionating distillation step in an effort to reject hydrocarbon polymers. In order to render such a process commercially attractive, it is necessary to recover the solvent employed in the extraction stage and to recycle the recovered solvent; if at least a major portion of the solvent is not recovered the loss of solvent becomes so high as to render the process commercially unprofitable.

In accordance with the present invention a rich solvent which has been formed in an extraction stage by contacting aqueous ammoniacal solvent with a $C_4$ hydrocarbon mixture is subjected to desorption to obtain a vaporous mixture including diolefin, ammonia and contaminating hydrocarbons and this mixture is treated to allow the recovery of a substantially pure diolefin fraction, a fraction including organic contaminants which are undesirable in the ammoniacal aqueous solvent and a fraction including ammonia.

It is known that the rich solvent obtained by contacting an ammoniacal aqueous solvent with the $C_4$ cut of the product obtained by subjecting a mono-olefin to dehydrogenation conditions includes an appreciable amount of acetylenes, such as methyl, ethyl and vinyl acetylenes. The diolefin from the $C_4$ hydrocarbon cut as well as the acetylenes are absorbed in the ammoniacal aqueous solvent and when the rich solvent is desorbed it is usually necessary to observe precautions in order to prevent the butadiene product from including an undesirably large amount of acetylenes. A method for desorbing diolefin from rich ammoniacal aqueous solvent and subsequently treating the recovered solvent to remove acetylenes therefrom and thereby prevent the accumulation of excessive amounts of acetylenes in the ammoniacal aqueous solvent is disclosed in my copending application Serial No. 536,667, filed May 22, 1944, now U. S. Patent No. 2,388,913.

It has now been discovered that the rich solvent obtained by contacting ammoniacal aqueous solvent with $C_4$ hydrocarbons obtained from a dehydrogenation step includes substantial amounts of carbonyls. These carbonyls are undesirable contaminants as are the acetylenes. In accordance with the present invention, the rich solvent obtained from an extraction step is subjected to desorption and fractionating conditions arranged to allow the recovery of a lean solvent, a substantially pure butadiene fraction suitable for product, a fraction containing carbonyls and an ammonia fraction substantially free from carbonyls and readily concentrated.

The practice of the present invention will now be described in greater detail in conjunction with the drawing in which the sole figure is in the form of a diagrammatic flow sheet. In the drawing the flow sheet is indicated as being divided into four principal steps, each of the steps being indicated as being enclosed within a dotted rectangle and the rectangles designated by Roman numerals. The steps carried out within the rectangles are as follows: "I"—Extraction, "II"—Purification, "III"—Desorption, and "IV"—Fractional distillation.

In the extraction step I a $C_4$ feed stock is passed through inlet line 11 into unit 12 where it is brought into contact with aqueous ammoniacal solvent. The lean solvent is passed into unit 12 via inlet 13 and is contacted with the feed to form a rich solvent. In the drawing, a single rectangle has been shown wherein the solvent is contacted with feed stock but this is merely symbolic and is employed in order to simplify the drawing. It will usually be desirable to employ a number of stages in the extraction step with a plurality of mixing zones and a plurality of settling zones but since the solvent extraction of such hydrocarbon fractions with solvents is well known to the art the details are not indicated in the drawing. It may be stated that commercially it has been found advantageous to employ an aqueous cuprous ammonium acetate solution for the solvent although other materials, such as ammoniacal water, may be employed for this purpose. It may also be stated that the use of five extraction stages is advantageous although any other convenient number may be employed. The hydrocarbon fractions from which the diolefins have been removed are discarded from unit 12 through outlet 14 while the rich aqueous ammoniacal solvent is withdrawn from unit 12 through line 15.

The rich solution is fed through line 15 to purification step II. Purification step II includes a plurality of vessels designated by numerals 16, 17, 18, 19 and 20. The extract passes in sequence through the vessels in the order named while in each vessel it is contacted with liquid hydrocarbon in order to increase the diolefin content of the extract. The extract is passed from vessel 16 to 17 through line 21, from vessel 17 to 18 through line 22, from vessel 18 to 19 through line 23 and from vessel 19 to 20 through line 24 provided with a suitable heating means such as a heat exchanger 24'. The liquid hydrocarbon phase with which the extract is contacted is passed through purification step II countercurrent to the rich solvent. The hydrocarbon phase is removed from vessel 20 through line 25 and discharged into line 23, the hydrocarbon phase from vessel 19 withdrawn through line 26 and discharged into line 22, the hydrocarbon phase from vessel 18 is withdrawn through line 27 and discharged into line 21 and the hydrocarbon phase is withdrawn from vessel 17 by line 28 and discharged into line 15. It is customary to operate the vessels 16, 17, 18, 19 and 20 on a temperature gradient, for example, vessel 16 may be at 24° F., vessel 17 at 28° F., vessel 18 at 32° F., vessel 19 at 38° F. and vessel 20 at 80° F.

The rich solvent with the diolefin content thereof increased by countercurrent extraction in purification step II is withdrawn from vessel 20 through line 29 and passes from purification zone II to desorption zone III. The hydrocarbon fraction with which the extract is contacted in purification zone II is fed into zone II via line 30 which discharges into line 24 at a point between heater 24' and vessel 20.

Line 31 is provided with a valve 31' and line 32 with a valve 32'; by varying the setting of the valves 31' and 32' the relative amount of rich solvent carried by the branch lines 31 and 32 may be varied at the will of the operator. It is usually desirable to pass a major portion of the rich solvent through line 32 and a minor portion flows through line 31; as an example, five parts of rich solvent may be passed through line 32 for one part of rich solvent passed through line 31.

The rich solvent is discharged from line 32 into a desorber vessel 33 which is operated under suitable pressure and temperature conditions to form a vaporous fraction removed overhead through line 34 and a lean solvent fraction withdrawn as bottoms through line 33'. It may be mentioned that the solvent fraction withdrawn through line 33' includes a substantial amount of acetylene and before this lean solvent is recycled to the extraction step I it is desirable to subject it to a suitable treatment for removal of the acetylene to prevent the progressive increase of absorbed acetylene in the solvent. A suitable method for removing acetylenes from the lean aqueous ammoniacal solvent withdrawn from a desorber vessel is disclosed in my copending application Serial No. 536,667 and since this procedure in itself does not form a part of the present invention it has not been shown in the drawing herein.

The vaporous stream in line 34 includes ammonia, diolefin, acetylenes and water-soluble carbonyl compounds. This vaporous stream passes into knock-out drum 35 for the separation therefrom of any entrained liquid materials and the vapors then pass through line 36 containing compresser 37. The vapors are compressed in compressor 37 and pass into condenser or vessel 38 where they are contacted with aqueous ammoniacal solvent for condensing the vapors and for the removal of a major portion of the ammonia and the acetylene therefrom. It is convenient to provide the aqueous ammoniacal solvent for scrubbing the vapors by using the stream separated through line 31 and passing it through manifold 39 into condenser or vessel 38. The condensed materials from condenser 38 pass through line 40, additional aqueous ammoniacal solution is added thereto through branch line 41 and the liquid phases are intimately admixed by passing through mixing device 42 which is arranged in line 40. Line 40 discharges the mixture into a settling vessel 43 where it is allowed to separate under the influence of gravity into a heavier aqueous solvent layer and a lighter hydrocarbon layer. The aqueous solvent layer may be conveniently disposed of by withdrawing it through line 44 and admixing it with the rich solvent passing through line 32 into desorber vessel 33. The hydrocarbon layer may be removed from an upper portion of vessel 43 through line 45 and passes into solvent knock-out drum 46 to separate any entrained solvent therefrom; the liquid hydrocarbons are removed from knock-out drum 46 through line 47, controlled by valve 47', and are passed from the desorption step III into fractional distillation step IV. When solvent is carried over into vessel 46, it may be drained by way of valved line 46' back into line 44.

The hydrocarbon stream is passed through line 47 into fractionating tower 48 which is operated to separate the stream into a bottoms fraction which is removed through outlet 49 and an overhead fraction which is removed through line 50. The higher boiling materials removed as the bottoms through outlet 49 include $C_5$ and greater molecular weight materials including the water soluble carbonyl compounds. The overhead fraction includes butadiene, ammonia and minor amounts of butylenes and acetylenes, and is removed through line 50 and discharged into unit 51 where it is scrubbed with water introduced through inlet 52 and manifold 53. In addition to the scrubbing water the materials present in vessel 51 are cooled by indirect heat exchange with cooling water introduced through line 54 and withdrawn through outlet 55. The resultant liquid mixture is passed from unit 51 via line 56 into an accumulator or settling vessel 57 where the mixture is allowed to separate into an aqueous phase including dissolved ammonia and a hydrocarbon phase. The aqueous phase accumulates in leg 58 and is withdrawn through outlet 59 while the hydrocarbon phase is withdrawn through line 60 containing pump 61. The discharge from pump 61 is split, with a portion recycled through line 62 to fractionator column 48 while the remainder passes through line 63 and is again divided. From line 63 a portion is recycled through line 30 to purification zone II where it is admixed with the rich solvent being passed from settling vessel 19 through line 24 to settling vessel 20 and the remaining portion is withdrawn through outlet 64 as product and is a commercial diolefin fraction.

As an example illustrating the practice of the present invention, the hydrocarbon feed stock charged to inlet 11 into extraction unit 12 may be a crude butadiene feed stock containing a major portion of butylene, from 12 to 14 mole per cent of butadiene 1,3 and from 200 to 300 P. P. M. of acetylenes. In addition to the acetylene contaminants the feed stock also contains water-soluble carbonyls as contaminants. In the extraction zone a rich extract is obtained including a high concentration of butadiene as well as the contaminants, acetylenes and carbonyls. The rich solvent is then passed to purification step II where the concentration of butadiene therein is increased by the countercurrent contact with the hydrocarbon stream. In the purification zone the butadiene concentration in the hydrocarbon stream recycled from settling zone 20 to settling zone 19 may be in the range of 90 to 93 wt. per cent butadiene 1,3. The rich solvent may be withdrawn from settling zone 20 at a rate of 60,000 gals./hr. and may be split, with 50,000 gals./hr. passing through line 32 to desorber 33 and 10,000 gals./hr. passing through branch line 31. The 50,000 gals./hr. are desorbed in vessel 33 with the upper portion of the vessel operated at a pressure of approximately 2 atmospheres absolute and a temperature of approximately 80° F. A typical composition of the vapors withdrawn through line 34 is as follows:

*Table 1*

| | Wt. Per cent |
|---|---|
| Ammonia | 5.00 |
| Butylene | .95 |
| Butadiene 1,3 | 93.92 |
| Acetylenes | .12 |
| Carbonyls | 0.01 |
| Total | 100.00 |

The vapors are compressed to a pressure of approximately 6 atmospheres absolute by passing through compressor 37 and are then cooled and contacted in vessel 38 with sufficient of the rich solvent in line 31 to condense totally the compressed vapors. Usually it will not be necessary to employ the full amount of the rich solvent passed through line 31 for condensing the vapors and the excess is then added to the condensed mixture flowing and admixed therewith upon passing through mixing unit 42. In settling vessel 43, the liquids are maintained at a temperature in the range of 80° to 90° F. to cause the settling of an aqueous layer and a hydrocarbon layer. The composition of a typical hydrocarbon mixture removed from drum 43 through line 47 and sent to fractionator 48 may be as follows:

*Table 2*

| | Wt. Per cent |
|---|---|
| Ammonia | 1.00 |
| Butylene | 1.00 |
| Butadiene 1,3 | 97.88 |
| Acetylenes | .02 |
| Carbonyls | .10 |
| Total | 100.00 |

A bottoms including water soluble carbonyl compounds is removed from fractionator 48, while the distillate fraction withdrawn from accumulator 57 through line 60 may have the following composition:

*Table 3*

| | Wt. Per cent |
|---|---|
| Ammonia | 0.00 |
| Butylene | 1.00 |
| Butadiene 1,3 | 98.98 |
| Acetylenes | 0.02 |
| Carbonyls | 0.00 |
| Total | 100.00 |

While I have given a specific example illustrating the practice of the present invention with preferred operating temperatures and pressures for a number of the zones and typical compositions of mixtures removed from several of the zones, it is to be understood that this example is given for illustrative purposes only and the specific conditions and compositions given are not intended to limit the operation of the process of the present invention. It will be understood by workmen skilled in the art that the operating conditions in the extraction step, purification step, desorption step and fractionating step may be varied over a substantial range and satisfactory results obtained; the composition of the product may also be varied over a substantial range without departing from the scope of the present invention.

An advantage of the present invention will be seen in the recovery of the ammonia as a fraction separate from the water-soluble carbonyls to allow the simple recovery of the ammonia employed in the process. It will also be seen as another advantage that the product recovered may have a butadiene content approaching 99% with a desirably small amount of acetylenes.

Having fully described and illustrated the practice of the present invention, what I desire to claim is:

1. In an absorption system wherein a rich aqueous ammoniacal solvent having dissolved therein diolefin, acetylenes and carbonyls is obtained, the steps of dividing the rich solvent into a major portion and a minor portion, subjecting the major portion to a desorption step to separate therefrom a vaporous fraction including ammonia, diolefin, acetylenes and carbonyls, increasing the pressure of said vaporous fraction, condensing the vaporous fraction, and contacting it with the minor portion of rich solvent to dissolve said ammonia and form a mixture, subjecting the mixture to gravity separation to form an aqueous layer and a hydrocarbon layer, fractionally distilling the hydrocarbon layer to separate it into an overhead fraction including diolefin and ammonia and a bottoms fraction including carbonyls, washing the vaporous fraction with water to dissolve the ammonia and form a mixture of hydrocarbons and water, separating said mixture under the influence of gravity into a hydrocarbon layer and an aqueous layer, and separately removing said layers.

2. In an absorption system wherein a rich aqueous ammoniacal solvent having dissolved therein diolefin, acetylenes and carbonyls is obtained, the steps of dividing the rich solvent into a major portion and a minor portion, subjecting the major portion to desorption conditions to recover a lean solvent and a vaporous mixture including ammonia, diolefin, acetylenes and carbonyls at a temperature of the order of 80° F., increasing the pressure of said vaporous mixture and intimately contacting it under liquefying conditions with said minor portion of rich solvent to form a mixture, settling the mixture under the influence of gravity to form a hydrocarbon layer and an aqueous layer, withdrawing the aqueous layer and mixing it with the major portion of rich solvent being fed to the desorption step, fractionally distilling the hydrocarbon layer to form a vaporous overhead fraction including ammonia and diolefin and a bottoms fraction including carbonyls, withdrawing the two fractions, contacting the vaporous overhead fraction with water to condense the diolefin and to dissolve the ammonia and form an aqueous solution thereof, and separately withdrawing the aqueous solution and the liquefied diolefin fraction.

3. In an absorption system wherein a rich aqueous ammoniacal solvent having dissolved therein diolefin, acetylenes and carbonyls is obtained, the steps of dividing rich aqueous solvent into a major portion and a minor portion, subjecting the major portion to desorption conditions and separating therefrom a fraction including ammonia, diolefin, acetylenes and carbonyls, intimately contacting said fraction, under liquefying conditions, with the minor portion of rich solvent to remove at least a major portion of the ammonia therefrom, subjecting the remainder of the fraction to a fractional distillation step to separate it into a lower boiling fraction including diolefin and ammonia and a higher boiling fraction including carbonyls and washing said lower boiling fraction with water to remove at least the major portion of ammonia therefrom.

4. In an absorption system wherein a rich aqueous ammoniacal solvent having dissolved therein butadiene, acetylenes and carbonyls is obtained, the steps of dividing the rich solvent into a minor portion and into a major portion approximately five times greater than the minor portion, subjecting the major portion to absorption conditions to recover a vaporous fraction at a temperature of approximately 80° F. and a pressure of approximately 2 atmospheres absolute and including ammonia, butadiene, acetylene and carbonyls, increasing the pressure of said vaporous fraction to approximately 6 atmospheres absolute and intimately contacting it with the minor portion of the rich solvent while condensing the vaporous fraction to form a liquid admixture, subjecting the admixture to settling under the influence of gravity and at a temperature of the order of 80° F. to form an aqueous layer and a hydrocarbon layer, withdrawing the aqueous layer and mixing it with the major portion of rich solvent being passed to the desorber stage, fractionally distilling the hydrocarbon layer to separate it into a higher boiling fraction including carbonyls and a lower boiling fraction including butadiene and ammonium, withdrawing the high boiling fraction from the fractional distillation step, withdrawing the lower boiling fraction in a vaporous condition from the fractional distillation step, intimately contacting it with water to dissolve the ammonia and to form a liquid hydrocarbon phase and a liquid aqueous phase, and separately withdrawing said phases.

5. In combination with an absorption system wherein there is obtained a rich aqueous ammonical solvent having dissolved therein diolefin and carbonyls, the steps of recovering from the rich aqueous ammonical solvent a hydrocarbon fraction comprising diolefin, ammonia and carbonyls, fractionally distilling said hydrocarbon fraction to separate a bottoms fraction comprising said carbonyls, and an overhead fraction comprising a major portion of the diolefin and contaminated with ammonia and free from carbonyls, and intimately contacting said overhead fraction with water to remove at least the major portion of ammonia therefrom.

IKE D. HALL.

REFERENCES CITED

The following references are of record in the file of this patent:

UNITED STATES PATENTS

| Number | Name | Date |
|---|---|---|
| 2,154,676 | Haeuber et al. | Apr. 18, 1934 |
| 2,369,559 | Gilliland | Feb. 13, 1945 |
| 2,390,764 | Wolff | Dec. 11, 1945 |

FOREIGN PATENTS

| Number | Country | Date |
|---|---|---|
| 547,730 | Great Britain | Sept. 9, 1942 |